United States Patent
Wang et al.

(10) Patent No.: US 7,957,110 B2
(45) Date of Patent: Jun. 7, 2011

(54) DISPLAY APPARATUS CURRENT DISCHARGING METHOD

(75) Inventors: Hung-Jen Wang, Hsinchuang (TW); Shao-Wu Hsu, Chia Yi (TW)

(73) Assignee: Hannstar Display Corporation, Tao-Yuan Hsien (TW)

( * ) Notice: Subject to any disclaimer, the term of this patent is extended or adjusted under 35 U.S.C. 154(b) by 986 days.

(21) Appl. No.: 11/774,794

(22) Filed: Jul. 9, 2007

(65) Prior Publication Data
US 2008/0012844 A1    Jan. 17, 2008

Related U.S. Application Data

(63) Continuation-in-part of application No. 11/042,034, filed on Jan. 25, 2005, now abandoned.

(51) Int. Cl.
*H02H 9/00* (2006.01)
(52) U.S. Cl. .......................... 361/56; 361/91.1; 361/111
(58) Field of Classification Search .................... 361/56, 361/91.1, 111
See application file for complete search history.

(56) References Cited

U.S. PATENT DOCUMENTS

| | | | |
|---|---|---|---|
| 3,873,905 A * | 3/1975 | Marek | 323/350 |
| 5,637,900 A | 6/1997 | Ker et al. | |
| 5,933,048 A | 8/1999 | Hidaka et al. | |
| 6,486,606 B1 | 11/2002 | Ting | |
| 6,646,693 B2 | 11/2003 | Zhang et al. | |
| 6,867,956 B2 | 3/2005 | Clark et al. | |
| 6,870,229 B2 | 3/2005 | Dessard et al. | |
| 6,914,758 B2 | 7/2005 | Ryan et al. | |
| 7,012,307 B2 | 3/2006 | Lin et al. | |

FOREIGN PATENT DOCUMENTS

JP    2002-237744    8/2002

OTHER PUBLICATIONS

IBM Techical Disclosure Bulletin Thin film Transistors/Liquid Crystal Display Design on a Thin Glass Nov. 1, 1996. volume No. 39 issue No. 11 pp. 183-184.*

* cited by examiner

*Primary Examiner* — Jared J Fureman
*Assistant Examiner* — Terrence R Willoughby
(74) *Attorney, Agent, or Firm* — Thomas, Kayden, Horstemeyer & Risley, LLP

(57) ABSTRACT

A display apparatus current discharging method, includes steps of: providing a potential difference between a first line and a second line; switching on a first switching element; generating a voltage drop of a resistance element having a first end and a second end; switching on a second switching element; providing a first discharging path through the first line, the first switching element, the resistance element, the second switching element, and the second line; and discharging a first current via the first discharging path. A display apparatus current leakage reducing method is also disclosed.

26 Claims, 6 Drawing Sheets

112b

112b

DISPLAY APPARATUS CURRENT DISCHARGING METHOD

CROSS-REFERENCE TO RELATED APPLICATION

This application is a continuation-in-part of U.S. patent application Ser. No. 11/042,034, filed Jan. 25, 2005, the contents of which are incorporated by reference herein.

BACKGROUND

1. Field of Invention

The present invention relates to a protection circuit with transistors. More particularly, the present invention relates to a display apparatus current discharging method and a display apparatus current leakage reducing method.

2. Description of Related Art

Flat panel displays are mostly made of insulating glass substrates, where electrostatic discharge (ESD) is easily induced to damage components thereof, greatly decreasing the manufacturing yield of the flat panel displays. Typically, protection circuits for preventing ESD are configured on display panels to achieve the protection of components.

FIG. 1 is a schematic view of a flat panel display with conventional protection circuits. As illustrated in FIG. 1, a display panel 100 has a plurality of scan lines 102 and a plurality of data lines 104. A plurality of display units 106 are provided at intersections of the scan lines 102 and the data lines 104. Protection circuits 112 are electrically connected between a discharging line 110 and one of the scan lines 102 or the data lines 104. When a discharging pulse is generated on the scan line 102 or the data line 104 due to the ESD of the display panel 100, the protection circuits 112 can disperse the discharging pulse to the discharging line 110 and thus prevent the display units 106 or other components from being damaged by the discharging pulse.

For the protection circuits, particularly the protection circuits for ESD used in the flat panel displays, the prior art provides several different implementations. FIG. 2A is a schematic view of a conventional protection circuit. As illustrated in FIG. 2A, two transistors 222a and 224a are electrically connected in parallel between the scan line 102 and the discharging line 110. When a drain and a gate of the transistor are short-circuited, the transistor is equivalent to a diode. FIG. 2B is an equivalent circuit diagram of the protection circuit 112a of FIG. 2A. The two equivalent diodes 222b and 224b are opposite to each other, and therefore are able to deal with discharging currents either from the scan line 102 to the discharging line 110 or from the discharging line 110 to the scan line 102.

U.S. Pat. No. 5,744,837 discloses another protection circuit, as illustrated in FIG. 3A. A protection circuit 112b comprises four transistors 322a, 324a, 326a and 328a electrically connected between the scan line 102 and the discharging line 110. A drain and a gate of each of the transistors 322a, 324a, 326a and 328a are individually short-circuited. FIG. 3B is an equivalent circuit diagram of the protection circuit 112b of FIG. 3A. The equivalent diodes 322b and 324b are opposite to the equivalent diodes 326b and 328b, and therefore, they are able to deal with discharging currents either from the scan line 102 to the discharging line 110 or from the discharging line 110 to the scan line 102.

U.S. Pat. No. 5,606,340 discloses another protection circuit, as illustrated in FIG. 4A. A protection circuit 112c comprises four transistors 422a, 424a, 426a and 428a electrically connected between the scan line 102 and the discharging line 110. A drain and a gate of each of the transistors 422a, 424a, 426a and 428a are individually short-circuited. FIG. 4B is an equivalent circuit diagram of the protection circuit 112c of FIG. 4A. As illustrated in FIG. 4B, the transistors 422a and 424a are equivalent to a switching element 422b, and ON/OFF states of the switching element 422b are controlled by the equivalent diodes 426b and 428b. When a potential difference between the scan line 102 and the discharging line 110 is great enough, the diodes 426b and 428b switch on the switching element 422b, such that the discharging currents are dispersed to the scan line 102 or the discharging line 110, which has a lower potential via the switching element 422b (i.e. the transistors 422a and 424a).

However, the foregoing conventional protection circuits have drawbacks such as large leakage currents, small discharging currents, slow discharging speed and easy disablements due to being damaged during manufacturing. In the flat panel display, a larger size or higher resolution indicates that the quantity of the contained scan lines and data lines are greater. If the leakage current of each protection circuit electrically connected to the corresponding scan line and data line is large, the total leakage current of the whole display panel becomes serious and causes tremendous power consumption. The power stored in a portable electronic device is finite. For example, the operating voltages of the in-plane switching (IPS) mode used in liquid crystal displays (LCDs) are higher than for average devices, so the leakage currents thereof are greater. In conclusion, these drawbacks are very disadvantageous to portable electronic devices and the IPS modes often used in LCD TVs.

SUMMARY

It is therefore an objective of the present invention to provide a protection circuit, which can reduce leakage currents, enlarge discharging currents, hasten discharging speed and avoid being easily disabled due to damage during manufacturing.

It is another objective of the present invention to provide a display device, which has lower leakage current and better protection from ESD.

In accordance with the foregoing and other objectives of the present invention, a display device and a protection circuit thereof are provided. The display device has a display array, a discharging line and a plurality of protection circuits. The display array has a plurality of scan lines, a plurality of data lines and a plurality of display units, and the display units are provided at intersections of the scan lines and the data lines. The discharging line surrounds the display array, and the protection circuits are electrically connected between the discharging line and the scan lines or the data lines.

Each of the protection circuits has a first discharging circuit, a second discharging circuit. The first discharging circuit has a first switching element, a resistance element and a second switching element electrically connected in series between the discharging line and one of the scan lines or the data lines to which the protection circuit is electrically connected. The resistance element controls the switch states of the second switching element. The second discharging circuit has a third switching element, the resistance element and a fourth switching element electrically connected in series between the discharging line and the one of the scan lines or the data lines to which the protection circuit is electrically connected. The resistance element controls the switch states of the third switching element, and the second and third switching elements are electrically connected.

According to one preferred embodiment of the present invention, a current direction of the first discharging circuit is opposite to a current direction of the second discharging circuit. When the second and third switching elements are switched on, the scan line or the data line discharges to the discharging line via the second and third switching elements. A gate and a drain of the first switching element are electrically connected to the scan line or the data line, and a gate and a drain of the fourth switching element are electrically connected to the discharging line. A gate of the second switching element is electrically connected to a gate of the third switching element, a drain of the second switching element is electrically connected to a drain of the third switching element, and the resistance element is connected between the gate and the drain of the second switching element.

A W/L of the second switching element is greater than a W/L of the first switching element, and a W/L of the third switching element is greater than a W/L of the fourth switching element. The W/L of the second switching element is equal to the W/L of the third switching element, and the W/L of the fourth switching element is equal to the W/L of the first switching element. A material of the resistance element is indium-tin oxide or amorphous silicon. Alternatively, the resistance element is a thin film transistor or a diode.

The protection circuit reduces the leakage currents of the first and second switching elements in the OFF states by the resistance element. Moreover, when the first and second switching elements are switched on by the great potential difference, the voltage drop of the resistance element sequentially switches on the second and third switching elements, so as to provide an additional discharging path between the discharging line and the scan line or the data line, thus enlarging the discharging currents and hastening the discharging speed. In addition, two separate discharging paths, i.e. the original discharging path and the additional discharging path, ensure that the protection circuit is not disabled due to damage during manufacturing, thus improving the reliability.

According to another embodiment, a display apparatus current discharging method comprises the steps of: A display apparatus current discharging method, comprising steps of: providing a potential difference between a first line and a second line; switching on a first switching element; generating a voltage drop of a resistance element having a first end and a second end; switching on a second switching element; providing a first discharging path through the first line, the first switching element, the resistance element, the second switching element, and the second line; and discharging a first current via the first discharging path.

According to another embodiment, a display apparatus current leakage reducing method comprises providing a potential difference between a first line and a second line; switching off a first switching element and a second switching element; providing a leakage path through the first line, a resistance element having a first end and a second end, and the second line; and reducing a leakage through the leakage path by the resistance element.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
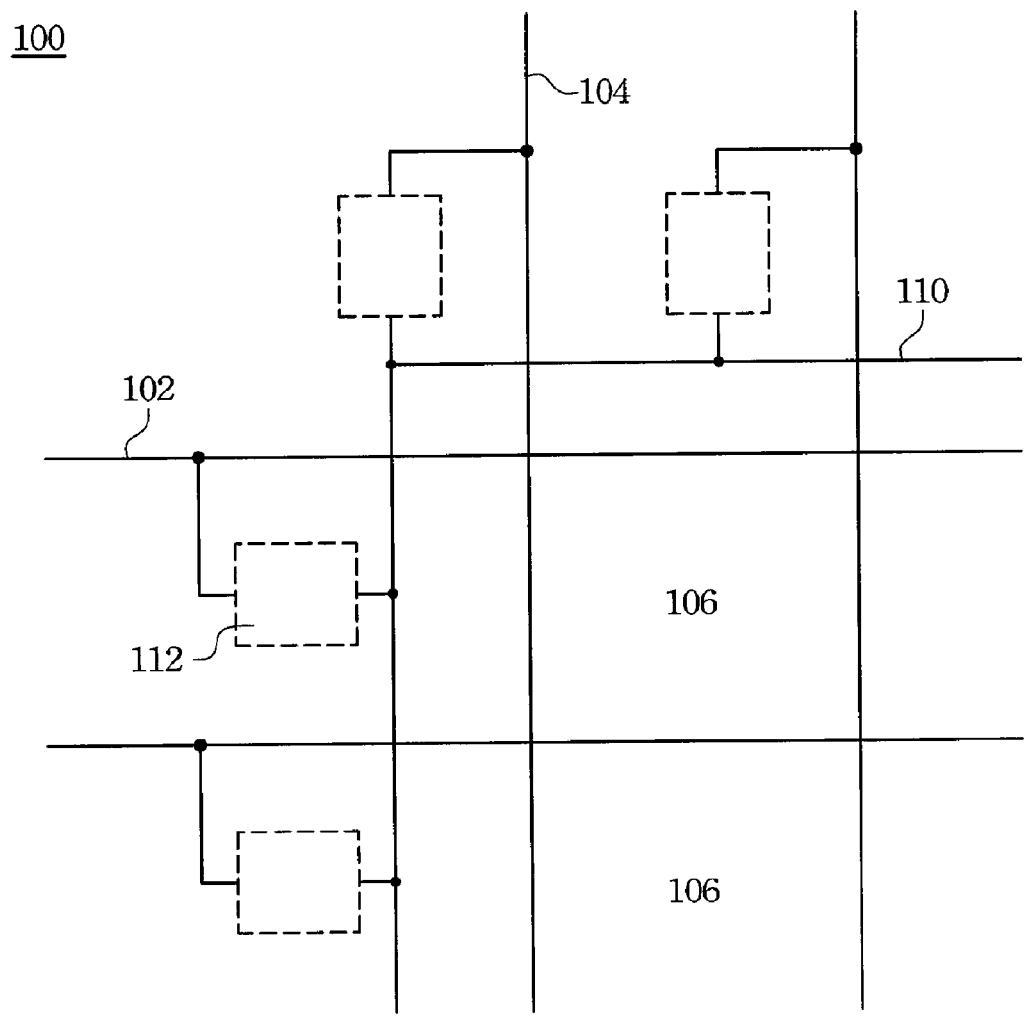
FIG. 1 is a schematic view of a flat panel display with conventional protection circuits.

Reference will now be made in detail to the present preferred embodiments of the invention, examples of which are illustrated in the accompanying drawings. Wherever possible, the same reference numbers are used in the drawings and the description to refer to the same or like parts.

Figure 5A:
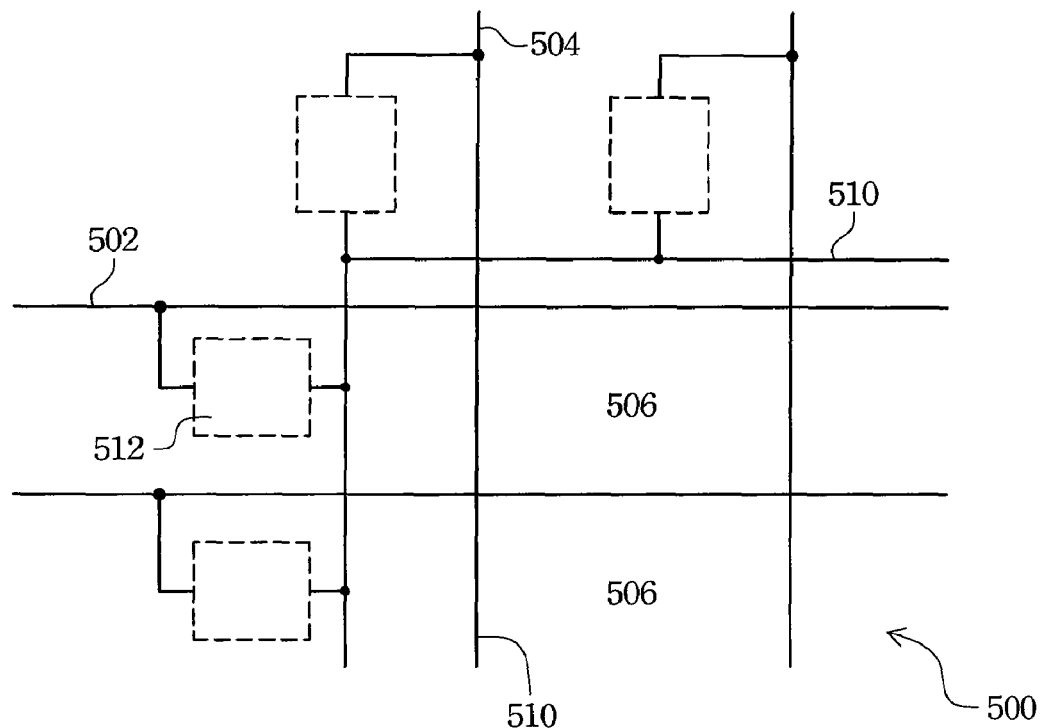
FIG. 5A is a schematic view of a display device of one preferred embodiment in the present invention.

FIG. 5A is a schematic view of a display device of one preferred embodiment in the present invention. As illustrated in FIG. 5A, the display device has a display array 500, a discharging line 510 and a plurality of protection circuits 512. The display array 500 has a plurality of scan lines 502, a plurality of data lines 504 and a plurality of display units 506. The display units 506 are provided at intersections of the scan lines 502 and the data lines 504. The discharging line 510 surrounds the display array 500, and the protection circuits 512 are electrically connected between the discharging line 510 and the scan lines 502 or the data lines 504. For example, when the display device is a liquid crystal display, a display unit 506 thereof is a liquid crystal cell comprising at least one thin film transistor.

Figure 5B:
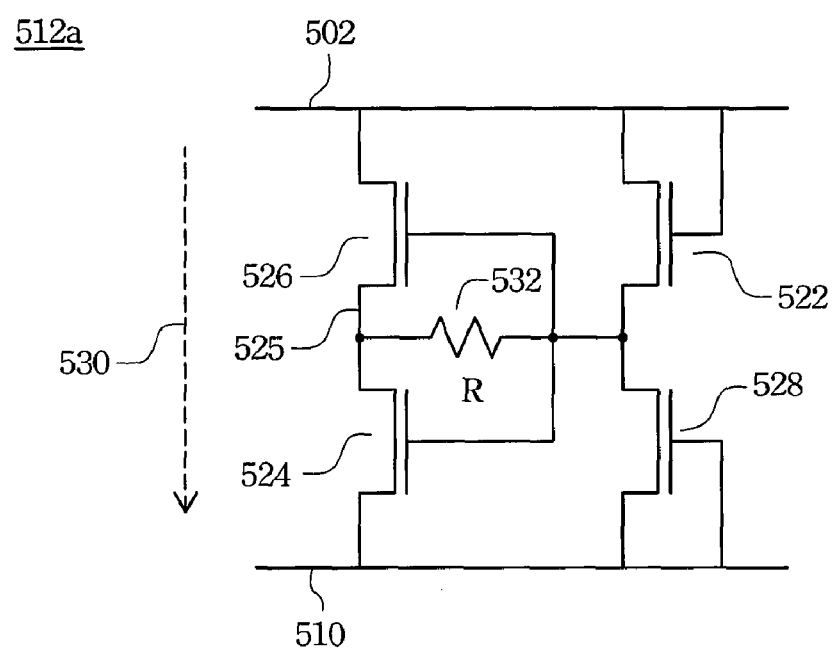
FIG. 5B is a schematic view of a protection circuit of one preferred embodiment in the present invention.

FIG. 5B is a schematic view of a protection circuit of one preferred embodiment in the present invention. For clarity, in the embodiment, a protection circuit 512a is electrically connected between the scan line 502 and the discharging line 510. However, the protection circuit 512a can also be connected between the data line 504 and the discharging line 510 to protect components on the data line 504.

As illustrated in FIG. 5B, each of the protection circuits 512a has a first discharging circuit and a second discharging circuit. The first discharging circuit has a first transistor 522, a resistance element 532 and a second transistor 524 electrically connected in series between the scan line 502 and the discharging line 510. A gate and a drain of the first transistor 522 are electrically connected. The second discharging circuit has a third transistor 526, the resistance element 532, and a fourth transistor 528 electrically connected in series between the scan line 502 and the discharging line 510. A gate and a drain of the fourth transistor 528 are electrically connected. Therefore, a current direction of the first discharging circuit is opposite to a current direction of the second discharging circuit.

Moreover, a gate of the second transistor 524 is electrically connected to a gate of the third transistor 526. A first electrode of the second transistor 524 is electrically connected to the scan line 502. A second electrode of the second transistor 524 is electrically connected to a first electrode 525 of the third transistor 526. In addition, the resistance element 532 is electrically connected between the gates and the second electrodes of the two transistors 524 and 526, and therefore the switch states of the second transistor 524 and the third transistor 526 can be controlled by the voltage drop on the resistance element 532.

According to the circuit configuration, the protection circuit 512*a* has two different current conditions in response to normal operation and the discharging operation. The following descriptions interpret the two different current conditions, separately.

When the protection circuit 512*a* is operated normally, where the potential difference between the scan line 502 and the discharging line 510 does not exceed a voltage tolerance, the current passes through the first transistor 522, the resistance element 532 and the second transistor 524, and through the fourth transistor 528, the resistance element 532 and the third transistor 526. Thus, the protection circuit 512*a* can reduce the leakage currents of the first and second discharging circuits by the resistance element 532. At the same time, the first electrode 525 of the third transistor 526 is used as a source thereof, and therefore an additional discharging path comprising the third transistor 526 and the second transistor 524 is in an OFF state. In other words, when the protection circuit 512*a* is normally operated, there is no discharging current generated between the scan line 502 and the discharging line 510.

When discharging is induced, where the potential difference between the scan line 502 and the discharging line 510 exceeds the voltage tolerance, one of the first and fourth transistors 522 and 528 is switched on by a forward potential difference between the scan line 502 and the discharging line 510. Moreover, at the same time, the voltage drop of the resistance element 532 sequentially switches on the second transistor 524 and the third transistor 526, and an additional discharging path is thus provided between the scan line 502 and the discharging line 510 for enlarging discharging currents and hastening discharging speed. In addition, the two separate discharging paths ensure that the protection circuit is not disabled due to damage during manufacturing, improving the reliability.

It is noticed that, during discharging, the first electrode 525 of the third transistor 526 is used as a drain of the same, and a first electrode of the second transistor 524 is used as a source of the same. That is, the drains and the sources of the second transistor 524 and the third transistor 526 are not limited, and the first electrodes and the second electrodes of both transistors can be sources or drains with respect to different conditions.

According to the preferred embodiment, the resistance value of the resistance element 532 is about 70 MΩ, and the material thereof can be indium-tin oxide or amorphous silicon. Alternatively, the resistance element 532 can be a thin film transistor or a diode. Some designations are determined for clear description, the channel width of a transistor is designated as W, and the channel length of the transistor is designated as L. A W/L of the first transistor 522 and a W/L of the fourth transistor 528 are both 10/15, and a W/L of the second transistor 524 and a W/L of the third transistor are both 45/5.25. In other words, the W/L of the second transistor 524 is greater than the W/L of the first transistor 522, and the W/L of the third transistor 526 is greater than the W/L of the fourth transistor 528.

Figure 2A:
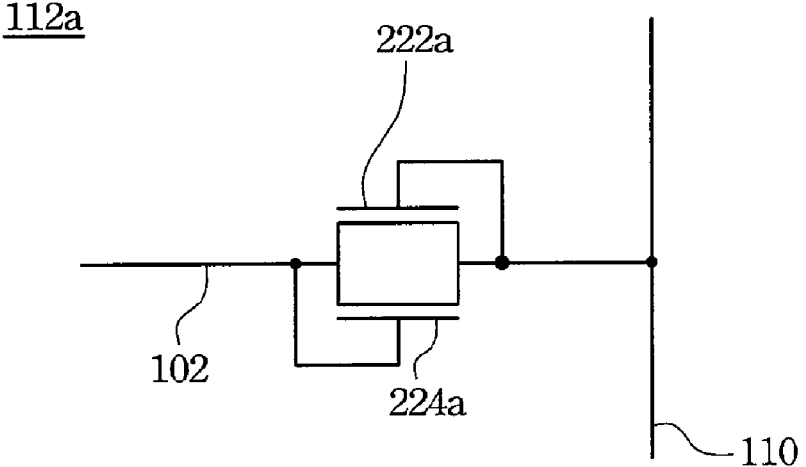
FIG. 2A is a schematic view of a conventional protection circuit.
Figure 2B:
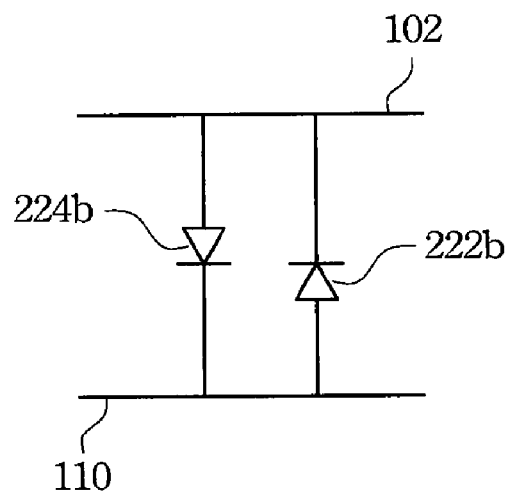
FIG. 2B is an equivalent circuit diagram of the protection circuit of FIG. 2A.
Figure 3A:
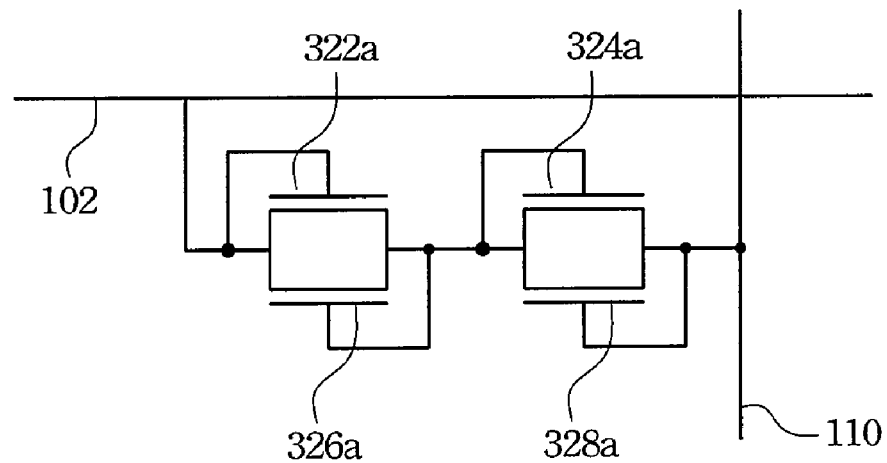
FIG. 3A is a schematic view of another conventional protection circuit.
Figure 3B:
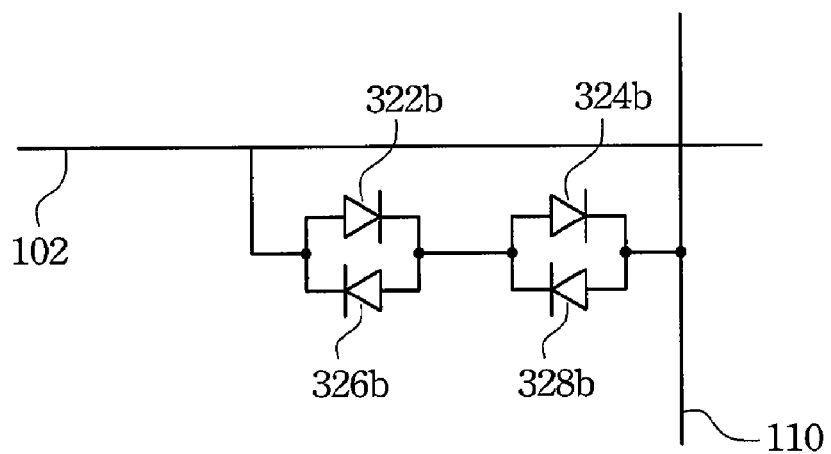
FIG. 3B is an equivalent circuit diagram of the protection circuit of FIG. 3A.
Figure 4A:
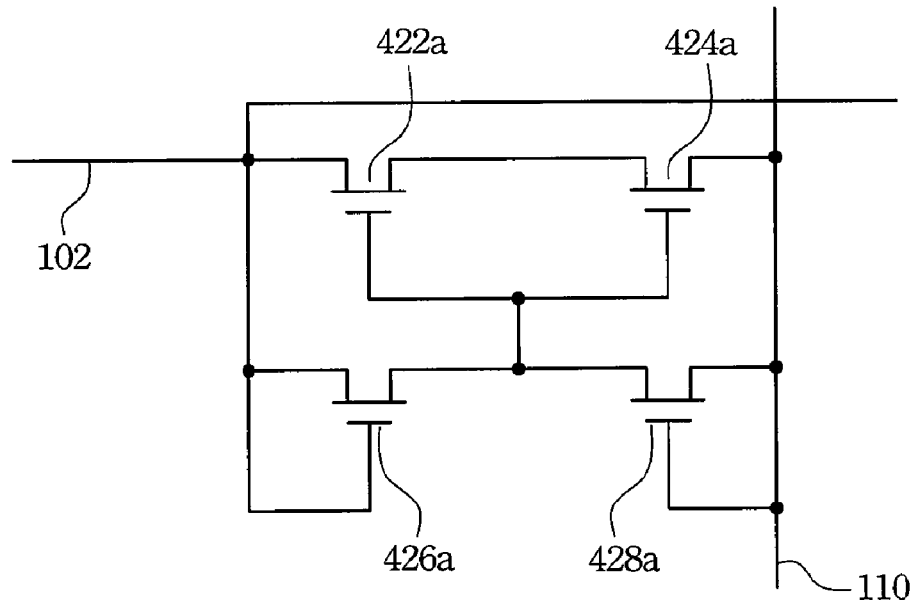
FIG. 4A is a schematic view of another conventional protection circuit.
Figure 4B:
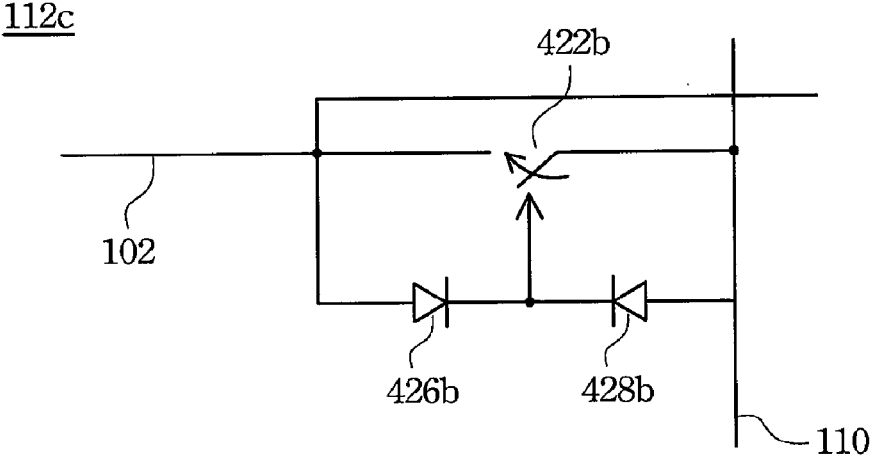
FIG. 4B is an equivalent circuit diagram of the protection circuit of FIG. 4A.

When the protection circuit 512*a* of the preferred embodiment is configured in a conventional twisted nematic (TN) liquid crystal display, the leakage current is one quarter of the leakage current of the protection circuit 112*b* illustrated in FIG. 3A under the potential difference of about 5V. Compared to the protection circuit 112*a* illustrated in FIG. 2A, the leakage current of the protection circuit 512*a* is decreased more than one order. Furthermore, when the protection circuit 512*a* of the preferred embodiment is configured in an IPS liquid crystal display, the leakage current is one-fifth of the leakage current of the protection circuit 112*b* illustrated in FIG. 3A under the potential difference of about 7V, and is one-seventh of the protection circuit 112*a* illustrated in FIG. 2A.

Figure 5C:
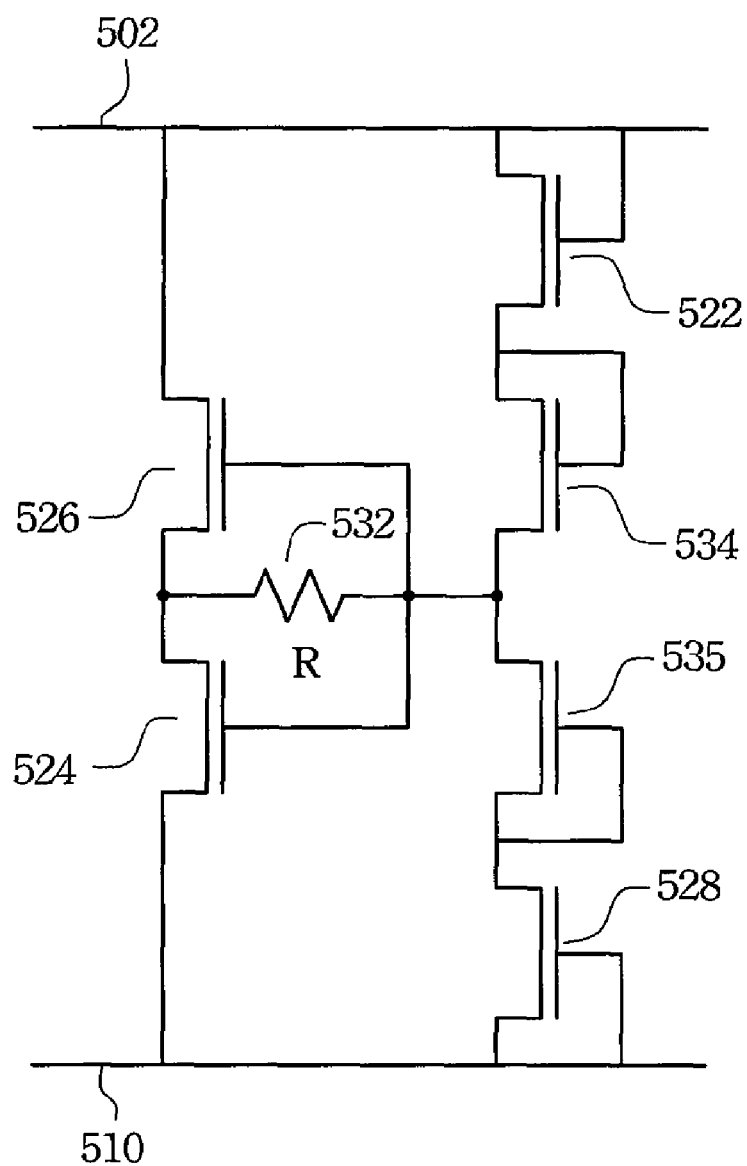
FIG. 5C is a schematic view of a protection circuit of another embodiment in the present invention.

FIG. 5C is a schematic view of a protection circuit of another embodiment in the present invention. As illustrated in FIG. 5C, the protection circuit 512*b* further comprises at least one fifth transistor 534, which is electrically connected between the resistance element 532 and the first transistor 522. A sixth transistor 535 can also be electrically connected between the resistance element 532 and the fourth transistor 528. The fifth transistor 534 and the sixth transistor 535 are used in conjunction with the first transistor 522 and the fourth transistor 528 for adjusting the summed and effective W/L. The fifth transistor 534 or the sixth transistor 535 can also be a resistance element. That is, the fifth transistor 534 and the sixth transistor 535 can be used in conjunction with the resistance element 532 for separately optimizing the individual resistance of the first discharging circuit and the second discharging circuit.

In one aspect, the foregoing embodiments also disclose a display apparatus current discharging method. A potential difference is provided between the scan line 502 and the discharging line 510. The first transistor 522 is switched on, and a voltage drop of a resistance element 532 is generated. The resistance element 532 has a first end and a second end. The second transistor 524 is then switched on, and a first discharging path through the scan line 502, the first transistor 522, the resistance element 532, the second transistor 524, and the discharging line 510 is provided. Thus, a first current is discharged via the first discharging path as stated above.

More particularly, a first electrode of the first transistor 522 is electrically connected to the scan line 502. A second electrode of the first 522 is electrically connected to the first end of the resistance element 532. A gate electrode of the first transistor 522 is electrically connected to the scan line 502. A first electrode of the second transistor 524 is electrically connected to the discharging line 510. A second electrode of the second transistor 524 is electrically connected to the second end of the resistance element 532. A gate electrode of the second transistor 524 is electrically connected to the first end of the resistance element 532. In the embodiment, a channel width-to-length ratio (W/L) of the second transistor 524 is greater than a W/L of the first transistor 522.

Moreover, the method can further have more steps as follows. A third transistor 526 is switched on, and a second discharging path 530 through the scan line 502, the third transistor 526, the second transistor 524, and the discharging line 510 is then provided. Thus, a second current is discharged via the second discharging path 530. Furthermore, a fourth transistor 528 can be switched off.

A first electrode of the third transistor 526 is electrically connected to the scan line 502. A second electrode of the third transistor 526 is electrically connected to the second end of the resistance element 532. A gate electrode of the third transistor 526 is electrically connected to the first end of the resistance element 532. A first electrode of the fourth transistor 528 is electrically connected to the discharging line 510. A second electrode of the fourth transistor 528 is electrically connected to the first end of the resistance element 532. A gate electrode of the fourth transistor 528 is electrically connected to the discharging line 510.

In another aspect, the foregoing embodiments further disclose a display apparatus current leakage reducing method. A potential difference is provided between the scan line 502 and the discharging line 510. When the first transistor 522 and the second transistor 524 are switched off, a leakage path through the scan line 502, the resistance element 532, and the discharging line 510 is provided. A leakage through the leakage path as stated above is reduced by the resistance element 532.

In the embodiment, the third transistor 526 and the fourth transistor 528 are both switched off while the first transistor 522 and the second transistor 524 are switched off. The material of the resistance element 532 is indium-tin oxide or amorphous silicon. For example, the resistance element 532 can be a thin film transistor or a diode.

The first electrode of the third transistor 526 is electrically connected to the scan line 502, the gate electrode of the third transistor 526 is electrically connected to the first end of the resistance element 532, and the second electrode of the third transistor 526 is electrically connected to the second end of the resistance element 532. The first electrode and the gate electrode of the fourth transistor 528 are electrically connected to the discharging line 510, and the second electrode of the fourth transistor 528 is electrically connected to the first end of the resistance element 532.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display apparatus current discharging method, comprising steps of:
    providing a potential difference between a first line and a second line;
    switching on a first switching element, wherein a first electrode of the first switching element is electrically connected to the first line;
    generating a voltage drop of a resistance element having a first end and a second end;
    switching on a second switching element via the voltage drop of the resistance element;
    providing a first discharging path through the first line, the first switching element, the resistance element, the second switching element, and the second line; and
    discharging a first current via the first discharging path.

2. The display apparatus current charging method according to claim 1, wherein a second electrode of the first switching element is electrically connected to the first end of the resistance element.

3. The display apparatus current charging method according to claim 1, wherein a gate electrode of the first switching element is electrically connected to the first line.

4. The display apparatus current charging method according to claim 1, wherein a first electrode of the second switching element is electrically connected to the second line.

5. The display apparatus current charging method according to claim 1, wherein a second electrode of the second switching element is electrically connected to the second end of the resistance element.

6. The display apparatus current charging method according to claim 1, wherein a gate electrode of the second switching element is electrically connected to the first end of the resistance element.

7. The display apparatus current charging method according to claim 1, further comprising steps of:
    switching on a third switching element;
    providing a second discharging path through the first line, the third switching element, the second switching element, and the second line; and
    discharging a second current via the second discharging path.

8. The display apparatus current charging method according to claim 7, wherein a first electrode of the third switching element is electrically connected to the first line.

9. The display apparatus current charging method according to claim 7, wherein a second electrode of the third switching element is electrically connected to the second end of the resistance element.

10. The display apparatus current charging method according to claim 7, wherein a gate electrode of the third switching element is electrically connected to the first end of the resistance element.

11. The display apparatus current charging method according to claim 7, further comprising a fourth switching element switched off.

12. The display apparatus current charging method according to claim 11, wherein a first electrode of the fourth switching element is electrically connected to the second line.

13. The display apparatus current charging method according to claim 11, wherein a second electrode of the fourth switching element is electrically connected to the first end of the resistance element.

14. The display apparatus current charging method according to claim 11, wherein a gate electrode of the fourth switching element is electrically connected to the second line.

15. The display apparatus current charging method according to claim 1, wherein a channel width-to-length ratio of the second switching element is greater than a channel width-to-length ratio of the first switching element.

16. A display apparatus current leakage reducing method, comprising steps of:
    providing a potential difference between a first line and a second line;
    switching off a first switching element and a second switching element, wherein a first electrode of the first switching element is electrically connected to the first line;
    providing a leakage path through the first line, a resistance element having a first end and a second end, and the second line; and
    reducing a leakage through the leakage path by the resistance element.

17. The display apparatus current leakage reducing method according to claim 16, further comprising a third switching element and a fourth switching element both switched off.

18. The display apparatus current leakage reducing method according to claim 16, wherein a first electrode of the third switching element is electrically connected to the first line, a gate electrode of the third switching element is electrically connected to the first end of the resistance element, and a second electrode of the third switching element is electrically connected to the second end of the resistance element.

19. The display apparatus current leakage reducing method according to claim 16, wherein a first electrode and a gate electrode of the fourth switching element are electrically connected to the second line, and a second electrode of the fourth switching element is electrically connected to the first end of the resistance element.

20. The display apparatus current leakage reducing method according to claim 16, wherein the resistance element is made of indium-tin oxide or amorphous silicon.

21. The display apparatus current leakage reducing method according to claim 16, wherein the resistance element is a thin film transistor or a diode.

22. The display apparatus current charging method according to claim 7, wherein a channel width-to-length ratio of the second switching element is greater than a channel width-to-length ratio of the first switching element, and a channel width-to-length ratio of the third switching element is greater than a channel width-to-length ratio of the fourth switching element.

23. The display apparatus current charging method according to claim 7, wherein a channel width-to-length ratio of the first switching element and a channel width-to-length ratio of the fourth switching element are both 10/15.

24. The display apparatus current charging method according to claim 7, wherein a channel width-to-length ratio of the second switching element and a channel width-to-length ratio of the third switching element are both 45/5.25.

25. The display apparatus current charging method according to claim 1, wherein a fifth switching element is connected between the resistance element and the first switching element for adjusting a resistance of the first discharging path.

26. The display apparatus current charging method according to claim 7, wherein a sixth switching element is connected between the resistance element and the fourth switching element for adjusting a resistance of the second discharging path.

* * * * *